US010673882B2

(12) United States Patent
Davis, III et al.

(10) Patent No.: US 10,673,882 B2
(45) Date of Patent: Jun. 2, 2020

(54) NETWORK FLOW CONTROL OF INTERNET OF THINGS (IOT) DEVICES (71) Applicant: International Business Machines Corporation, Armonk, NY (US)

(72) Inventors: Charles K. Davis, III, Denver, CO (US); Chris Dotson, Lexington, KY (US); Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 15/871,351

(22) Filed: Jan. 15, 2018

(65) Prior Publication Data

US 2019/0222594 A1 Jul. 18, 2019

(51) Int. Cl.
*H04L 29/06* (2006.01)
*H04L 12/801* (2013.01)
*H04L 12/24* (2006.01)
*H04L 12/26* (2006.01)
*G06N 3/08* (2006.01)
*H04L 29/08* (2006.01)
*G06N 20/00* (2019.01)

(52) U.S. Cl.
CPC ...... *H04L 63/1425* (2013.01); *H04L 41/0681* (2013.01); *H04L 41/0816* (2013.01); *H04L 41/14* (2013.01); *H04L 43/026* (2013.01); *H04L 43/04* (2013.01); *H04L 47/10* (2013.01); *H04L 63/1416* (2013.01); *H04L 63/1433* (2013.01); *G06N 3/088* (2013.01); *G06N 20/00* (2019.01); *H04L 43/08* (2013.01); *H04L 67/02* (2013.01); *H04L 67/10* (2013.01); *H04L 67/12* (2013.01)

(58) Field of Classification Search
CPC ..... H04L 63/1425; H04L 41/14; H04L 43/04; H04L 47/10; H04L 63/1416; H04L 43/08; H04L 67/10; H04L 67/12; G06N 20/00; G06N 3/088
USPC ........................................................ 726/22
See application file for complete search history.

(56) References Cited

U.S. PATENT DOCUMENTS

9,516,053 B1 * 12/2016 Muddu ................. G06F 3/0482
9,979,606 B2 * 5/2018 Gupta ................. H04L 12/2816
(Continued)

*Primary Examiner* — Kambiz Zand
*Assistant Examiner* — Mohammad S Shams
(74) *Attorney, Agent, or Firm* — Jeffrey S. LaBaw; David H. Judson (57) ABSTRACT A method, apparatus and computer program product for use in monitoring and controlling network behavior of Internet of Things (IoT) devices connected to a network. According to this approach, a set of network characteristics of an IoT device (e.g., as published by the device manufacturer) are assigned various risk values and then monitored over an initial time period to generate a "fingerprint" of the device's network flow. This flow is then transformed into one or more flow control rules representing "normal" or abnormal behavior of the IoT device. Preferably, the rules are instantiated into a network boundary control system (NBCS), such as an enterprise router, gateway, or the like, and then enforced, e.g., to generate alerts or others actions when the rules are triggered. The approach enables dynamic and automated threat detection and prevention based on anomalous and/or known-bad behavior.

20 Claims, 5 Drawing Sheets (56) References Cited

U.S. PATENT DOCUMENTS

| | | |
|---|---|---|
| 2015/0163121 A1* | 6/2015 | Mahaffey ............ G06F 11/0709 |
| | | 707/687 |
| 2015/0195126 A1 | 7/2015 | Vasseur et al. |
| 2016/0261465 A1* | 9/2016 | Gupta ................. H04L 12/2816 |
| 2016/0352766 A1 | 12/2016 | Flacher et al. |
| 2017/0111373 A1* | 4/2017 | Morton ................. H04L 63/126 |
| 2017/0236080 A1* | 8/2017 | Singh ...................... H04W 4/70 |
| | | 705/7.28 |
| 2017/0339178 A1* | 11/2017 | Mahaffey ............ G06F 11/3072 |
| 2018/0046457 A1* | 2/2018 | Branca ...................... G06F 8/60 |
| 2018/0047107 A1* | 2/2018 | Perl ......................... G06N 5/02 |
| 2018/0144139 A1* | 5/2018 | Cheng .................. G06F 21/577 |
| 2018/0212985 A1* | 7/2018 | Zadeh ................. H04L 63/1425 |
| 2018/0219888 A1* | 8/2018 | Apostolopoulos ........................... |
| | | G06F 16/9024 |
| 2018/0302425 A1* | 10/2018 | Esman, Sr. ......... H04L 63/1425 |
| 2019/0128686 A1* | 5/2019 | Epperlein .............. G06Q 10/04 |
| 2019/0197442 A1* | 6/2019 | Lu .......................... G06N 20/00 |

\* cited by examiner

NETWORK FLOW CONTROL OF INTERNET OF THINGS (IOT) DEVICES

BACKGROUND

Technical Field

This disclosure relates generally to information processing and, in particular, to managing an Internet of Things (IoT) device.

Background of the Related Art

The "Internet of Things" refers to the network of physical objects or "things" that are embedded with and/or otherwise include electronics, software, sensors, and Internet-accessible network connectivity that allow these objects to collect and exchange data. Due to the increase in physical devices with network connectivity capabilities, the IoT is growing rapidly. In the IoT, sensors/devices of many different types and capabilities are deployed for different purposes. These sensors/devices communicate using different protocols/methods, and they require correspondingly different interfaces to manage. These devices are manufactured by many different manufacturers and, as a consequence, have different and quite varied sets of operating characteristics. Further, presently there are different management systems for different types of sensors/devices in these networks. Mapping and managing the sensors/devices typically requires multi-level management systems (sometimes called a manager of managers). These multi-level management systems are often unwieldy, and they are difficult to adapt to the addition of new types of devices/sensors.

BRIEF SUMMARY

The subject matter herein describes a method, apparatus and computer program product for use in monitoring and controlling network behavior of Internet of Things (IoT) devices connected to a network. According to this approach, a set of network characteristics of an IoT device (e.g., as published by the device manufacturer) are assigned various risk value(s) and then monitored over an initial time period to generate a "fingerprint" of the device's network flow. This flow is then transformed into one or more flow control rules representing "normal" or abnormal behavior of the IoT device. Preferably, the rules are then instantiated into a network boundary control system (NBCS), such as an enterprise router, gateway, or the like, where they are enforced, e.g., to generate alerts or others actions when the rule(s) are triggered. The approach enables dynamic and automated threat detection and prevention based on anomalous and/or known-bad behavior associated with the IoT device.

According to a first aspect of this disclosure, a method of controlling network behavior of an Internet of Things (IoT) device begins by receiving a first data set defining a set of one or more network characteristics associated with the IoT device. The first data set may be received from a manufacturer of the device. A set of one or more risk values are then associated with the network characteristics, e.g., by a network administrator. During a given learning period, e.g., for a number of days after the IoT device first makes contact, network flows associated with the device are monitored against the set of network characteristics and their associated risk values to generate a fingerprint that defines an anticipated normal behavior of the IoT device with respect to a given operating environment. The fingerprint for the device is then converted into a set of one or more network flow rules. These rules are then instantiated in a network boundary control system (NBCS) (e.g., a firewall, an enterprise router, a gateway, or the like) to monitor for anomalous behavior associated with the IoT device. In particular, when a particular network flow condition thereafter triggers one of the network flow rules (thereby indicating behavior that deviates from the "normal" IoT device behavior), a particular reporting or mitigation action (preferably as also defined in the rule) is then taken.

According to a second aspect of this disclosure, an apparatus for controlling an IoT device is described. The apparatus comprises a hardware processor, and computer memory holding computer program instructions executed by the hardware processors to perform a set of operations such as described above.

According to a third aspect of this disclosure, a computer program product in a non-transitory computer readable medium for use in a data processing system for controlling an IoT device is described. The computer program product holds computer program instructions executed in the data processing system and operative to perform operations such as described above.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
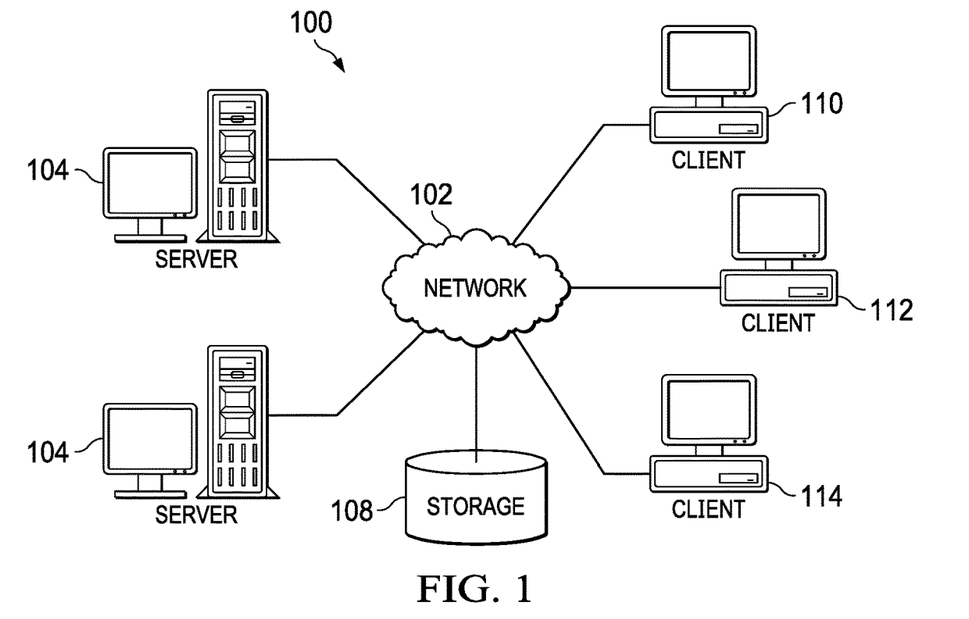
FIG. 1 depicts an exemplary block diagram of a distributed data processing environment in which exemplary aspects of the illustrative embodiments may be implemented.
Figure 2:
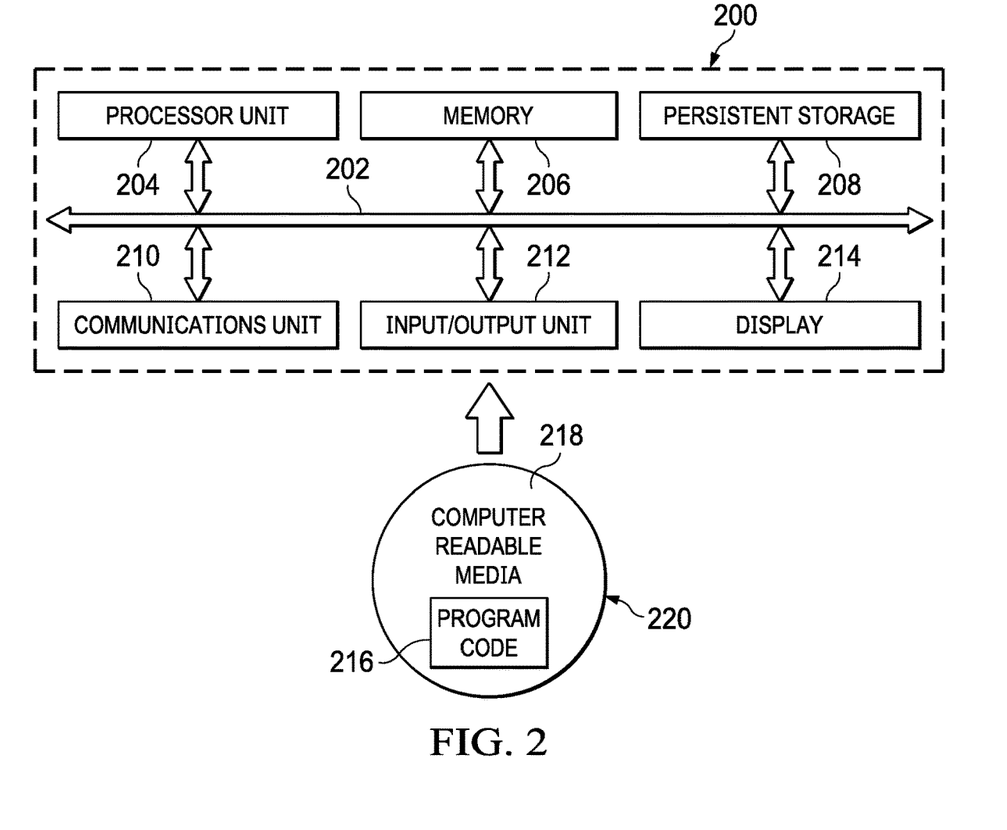
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Internet of Things

Figure 3:
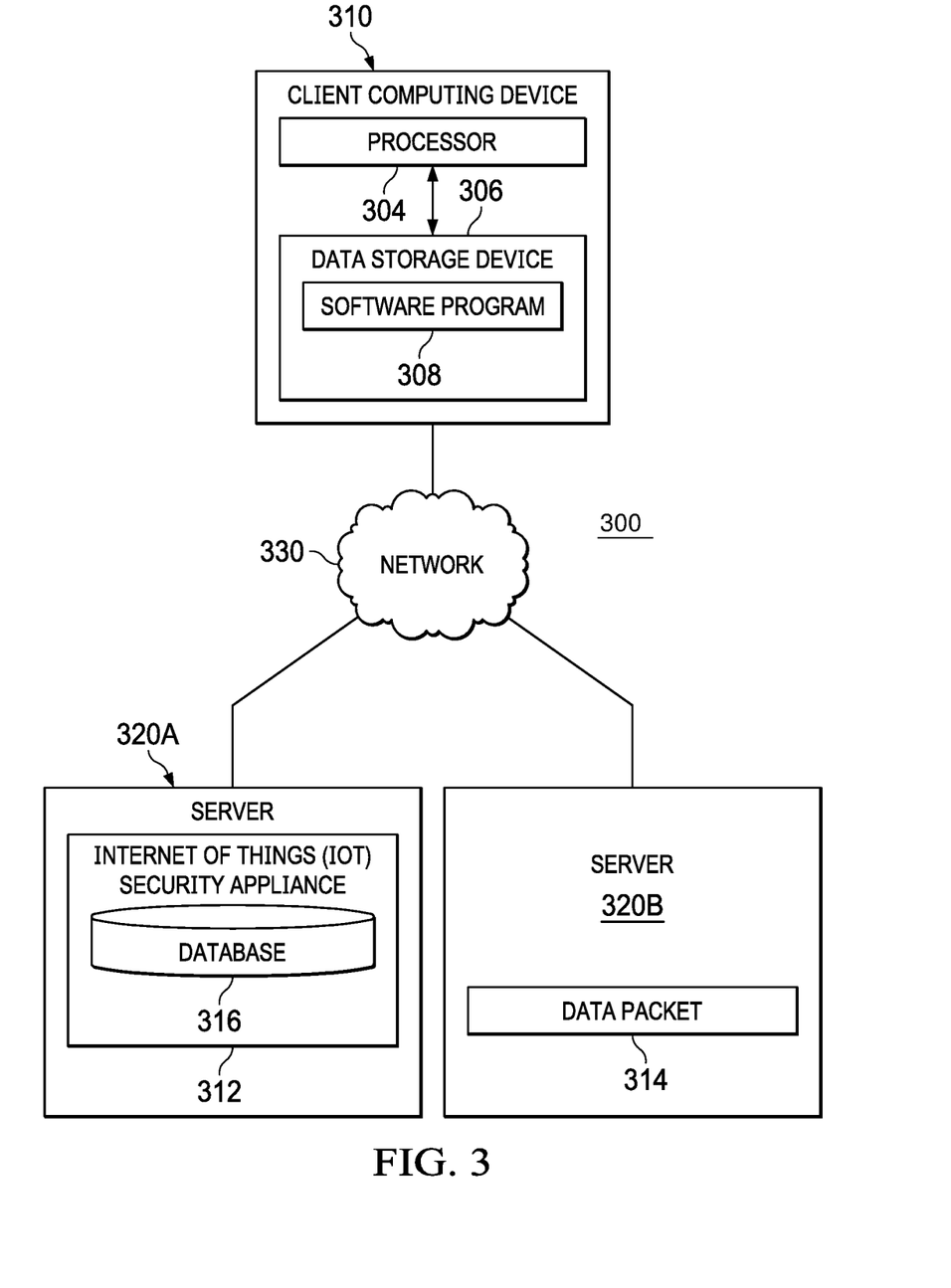
FIG. 3 illustrates a simplified IoT networking environment.

As previously described, the IoT relates to a network of physical devices, such as smartphones, vehicles, appliances, and other items, each with installed capabilities to allow for network connectivity. FIG. 2 is representative of computing device functionality that may be leveraged in an IoT device. Referring to FIG. 3, an exemplary IoT networked computer environment 300 is depicted, according to at least one embodiment. As in FIG. 1, the networked computer environment 100 includes a client computing device 310 and a server 320A, 320B interconnected via a communication network 330. According to at least one implementation, the networked computer environment 300 may include a plurality of client computing devices 310, only one of which is shown for illustrative brevity. The networked computer environment 300 may also include a plurality of servers 320A, 320B, only two of which are shown for illustrative brevity. The communication network 330 may include various types of communication networks, such as a wide area network (WAN), local area network (LAN), a telecommunication network, a wireless network, a public switched network and/or a satellite network. The communication network 330 may include connections, such as wire, wireless communication links, or fiber optic cables. Of course, it should be appreciated that FIG. 3 provides only an illustration of one implementation and does not imply any limitations with regard to the environments in which different embodiments may be implemented. Many modifications to the depicted environments may be made based on design and implementation requirements.

As was depicted in FIG. 2, the client computing device 310 includes a processor 304 and a data storage device 306 that is enabled to host and run a software program 308 and communicate with the server 320A, 320B via the communication network 330. In at least one embodiment, the client computing device 310 is an IoT device. Typically, an IoT device includes various components, such as a listener, a broadcaster, a recorder, and a sensing/actuation component. In general, the listener serves to receive data or other input via the communication network, while the broadcaster serves to broadcast data or other output via the network. The sensing/actuation component undertakes sensing and actuation functions conventionally associated with IOT devices. Generally, the sensing/actuation component may serve to undertake sensing or measurement of ambient parameters, such as temperature, brightness, sound, etc., as may be appropriate in the context of the device. The recorder serves to log data.

The server computer 320A, 320B may be a laptop computer, netbook computer, personal computer (PC), a desktop computer, or any programmable electronic device or any network of programmable electronic devices capable of hosting and running an IoT security appliance 312 and a data packet 314 and communicating with the client computing device 310 via the communication network 330. The server 320A, 320B may also operate in a cloud computing service model, such as Software as a Service (SaaS), Platform as a Service (PaaS), or Infrastructure as a Service (IaaS). The server 320A, 320B may also be located in a cloud computing deployment model, such as a private cloud, community cloud, public cloud, or hybrid cloud.

In a typical embodiment, the IoT security appliance 312 is a program capable of scanning an incoming data packet 314 through original signature-based and/or behavior-based patterns to detect data leaks. To this end, the IoT security appliance 312 may contain a data repository, such as database 316, to store existing IoT images, such as those received from a manufacturer, or those otherwise manually imported by a user.

Figure 4:
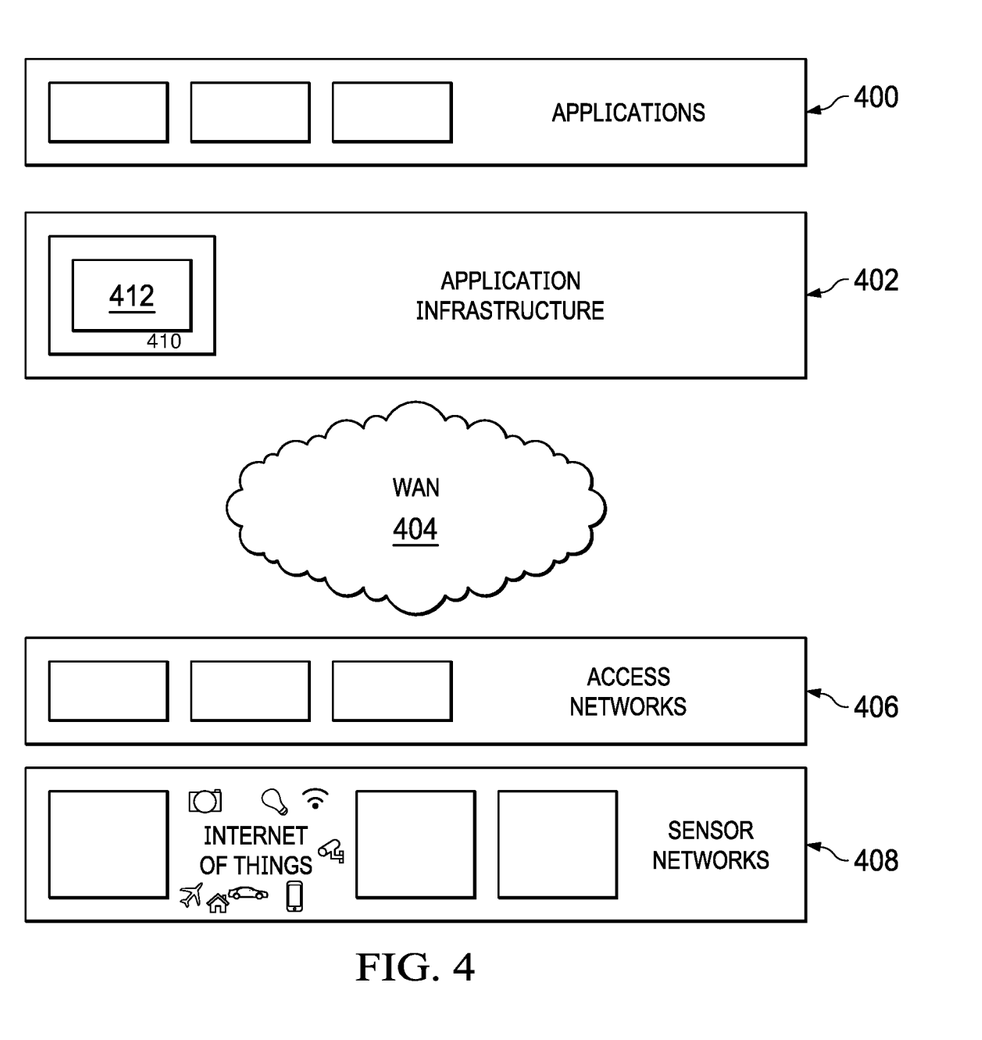
FIG. 4 depicts an IoT architecture in which the techniques of this disclosure may be implemented.

Referring now to FIG. 4, a representation IoT architecture is depicted in additional detail. This architecture typically comprises applications 400, application infrastructures 402, a wide area network (WAN) 404, an access network 406, and a sensor network 408. The sensor network 408 includes a plurality of sensor devices, which collect data information externally, and transmit to the application infrastructures 402 through the WAN 404. The application infrastructures 402 include an information database 410 and application gateways 412. Data filtering and distribution typically are realized in the application gateways 412.

In particular, in the IOT as depicted, the application gateways for data aggregation and distribution are located between the application servers and underlying sensor networks. Because the data amount in the TOT is very large, and because every application 400 is not necessarily concerned with all of the data, typically each application must define some rules for data filtering in the application gateways 412 such that only TOT data meeting rules defined by an application are forwarded by an application gateway to the application. To this end, the application gateway may include a data filtering mechanism that includes the capability to receive an application-deployed rule, and to convert the rule into an expression having both static predicates and dynamic predicates. The static predicates represent static properties of the sensor devices, such as, device identifier, geographic location, device type, and manufacturer, and where static properties imply no variations with time. Dynamic predicates, in contrast, are defined as predicates associated with dynamic properties of data collected by sensor devices. Dynamic predicates generally refer to data collected by a sensor device and whose values vary with time, and properties defining those values are dynamic properties (e.g., a temperature value measured by a temperature sensor). In operation, the filter mechanism receives data collected by the sensor devices, matches the collected data with the static predicates and the dynamic predicates, and then distributing any matched data to the application.

Network Flow Control of IoT Devices

With the above as background, the techniques of this disclosure are now described in detail. In this approach, it is assumed that one or more IoT manufacturers publish, at their own web site(s), and/or at a common industry site, and/or through a third party, the "flow attributes" associated with a particular IoT device that is sourced from the manufacturer, the manufacturer's representative or other proxy. These flow attributes represent a set of network characteristics that the manufacturer (or some other entity), for example, considers to represent "normal" behavior of the IoT device. The set of network characteristics of course will vary based on the type and purpose of the IoT device. Representative network characteristics include, without limitation: whether or not the device sends/receives data using encryption, whether or not the device performs clear-text Data Loss Prevention (DLP) checks, the nature of the device's bandwidth requirements and anticipated use, anticipated communication frequency, anticipated communication volume, information associated with the device's recommended network address and port assignments, information associated with the protocol(s) utilized by the device, other specific device capabilities (e.g., processing time, memory requirements, etc.), device capability types, generic device capability and use, and so forth.

According to this disclosure, upon activation of the device (or otherwise), network flows associated with the device are monitoring with respect to these published network characteristics to derive a set of one or more flow control rules. In particular, when the IoT device initially begins to communicate, its communication flow is fingerprinted, and the resulting "fingerprint" is transformed into the one or more flow control rules that, in effect, represent the so-called "normal" or anticipated behavior of the IoT device. Stated another way, the device "fingerprint" is defined as the observed behavior of the IoT device and that is declared to be its "normal" flow. As a corollary, and given the one or more flow control rules that represent the "normal" flow, additional rule(s) may be generated or derived and that represent "abnormal" flow. According to this disclosure, the one or more flow control rules for the device are then provided or otherwise instantiated in a network boundary control system (NBCS), where they are implemented to provide monitoring and alerting. Typically, the NBCS is an access and/or flow control device that may be implemented within an access network or application gateway (as depicted in FIG. 4). Representative NBCS may include, without limitation, a firewall, a router, a gateway, an intrusion protection device, or the like. Once instantiated, data generated from the IoT device is monitored, and that data is then matched against a given flow control rule to determine whether the data represents some type of anomaly with respect to the device's normal behavior. If a match occurs, a given action associated with a rule (e.g., alerting, device shutdown, mitigation or other remediation, etc.) is then taken.

Figure 5:
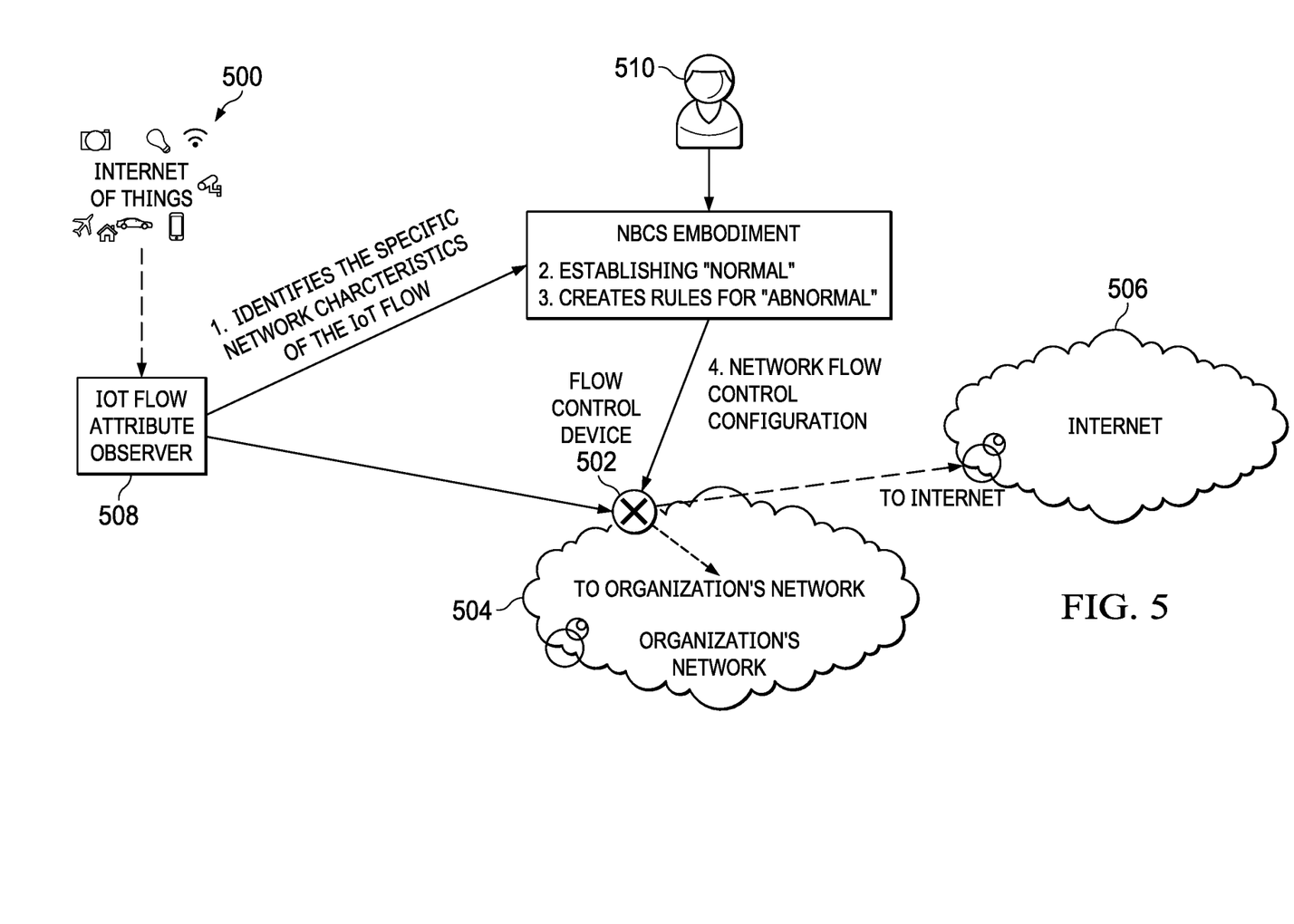
FIG. 5 depicts an implementation of the techniques of this disclosure.

FIG. 5 depicts the basic approach of this disclosure. As shown, IoT 500 is coupled via a flow control device 502 to an organization's network 504, and, in some instances, also to the Internet 506. Typically, and as depicted, the flow control device 502 comprises a part of a network boundary control system NBCS, such as an enterprise router. An IoT attribute flow attribute observer 508 (which may be part of (or otherwise associated with) the NBCS) is coupled to the flow control device 502. In one embodiment, the attribute observer 508 is implemented (typically as software) in an access network, such as depicted in FIG. 4. In this embodiment, and without intending to be limiting, a network administrator 510, having reviewed published information from an IoT manufacturer (or other source), identifies the set of network characteristics (or some specific network characteristic) to observe for the IoT device (or device type) in question, together with additional information, e.g., a desired risk level associated with those characteristics. Thus, for example, and at step (1), the administrator may specify the following network characteristics to be of interest for monitoring and analysis of the device's normal behavior: encryption versus no encryption, clear-text DLP check, bandwidth changes, pattern changes in frequency of communication (e.g., on average the device communicates once every 5 minutes, or 7 short messages over a minute followed by a one hour wait, etc.), pattern changes in volume of communication (e.g., all "normal" communications comprise a payload of 100 KB-2 MB), whether changes to MAC addresses for the device are anticipated, whether changes to the device's destination port, protocol and/or address are anticipated, and so forth.

As noted, preferably the administrator or other permitted person or entity also associates various "risk" levels with respect to the set of one or more network characteristics. A risk level associated with a particular network characteristic typically represents an attempt to quantify the degree to which variation from the characteristic will be considered by the system to be an "anomaly" from the device's "normal" behavior. Typically, the nature and amount of the variation is reified into a "weight" or "weighting" associated with the characteristic, although this is not a limitation. To provide a more concrete example, representative examples of risk levels that the administrator may specify might then be assigned as follows: is traffic encrypted (if no, +1); does clear-text traffic include sensitive information e.g., UID/PW, SPI, etc. (if yes, +15); has overall bandwidth changed from normal by more than a given percent (if yes, +2 for 20%, +3 for 30%, +4 for 40%, etc.); have pattern changes (frequency) in communications deviated from the normal by more than a given percent (if yes, +2 for 20%, +3 for 30%, +4 for 40%, etc.); have pattern changes (volume) in communications deviated from the normal by more than a given percent (if yes, +2 for 20%, +3 for 30%, +4 for 40%, etc.); has the MAC address of the device changed (if yes, +1); have other address or port changes been observed (if yes, destination port +3, protocol +5, destination address +4, etc.), and so forth. Of course, the attributes and their associated weightings may be varied, and the above examples are not intended to limit the scope of this disclosure. The administrator may associate the risk values to the network characteristics using a web-based configuration tool, a command line interface (CLI), or in any other manual, automated or programmatic manner. In an alternative embodiment, these attributes and the weightings may be predetermined or preconfigured, e.g., by the manufacturer, by an entity that provides such information, e.g., as-a-service, by an entity that has configured such information on its own behalf, by the user of the device, or otherwise. Also, other types of weightings (e.g., "high" or "low") may be used as well. Within a particular rule, these weights may be combined or used individually, or in some combination of combined and individual values. Another variant scenario might involve selective application of unitary risk values such that, under an approach circumstance, a rule may be triggered based on network characteristic itself.

Referring back to FIG. 5, at step (2), and during an initial phase (such as N days after installation, configuration, or otherwise), the NBCS (using the attribute observer and a rules engine or similar processing capability) monitors and measures the configured set of network characteristics. In this manner, the NBCS operates in a "learning" mode to determine what is "normal" behavior for the IoT device. During the operation at step (2), the NBCS monitors for the identified set of network characteristics; as the variations occur, the associated risk values are captured, aggregated and normalized as necessary to create the "fingerprint" of the observed flow. Thereafter, and at step (3), the NBCS, using its rules engine, generates the set of one or more flow control rules that represent the so-called "normal" or anticipated behavior of the IoT device. In particular, preferably the NBCS rules engine creates these one or more rules (defining normal or abnormal behavior) by applying the "normal" thresholds to the characteristics and risk levels (e.g., as defined by the network administrator or otherwise obtained by the system). At step (4), the derived rules, which are customized for the particular device and its network operating environment, are then instantiated into the NBCS (or other device) for real-time monitoring of the device's behavior going forward.

While the particular rule syntax may vary depending on implementation, typically a particular rule has a value to be monitored, a condition, and an action. The condition typically represents a threshold associated with the value being monitored, and the action represents a response in the event the condition is met. Thus, for example, a typical action may be ALERT or ACT/ALERT. Other actions may be implemented of course. Thus, for example, an ALERT action is taken if the rule trigger of violation exceeds an ALERT score (between, e.g., 2 and 9), in which case the NBCS preferably logs/alerts the violation. An ACT/ALERT condition may be triggered, for example, if the rule trigger or violation exceeds a certain higher score (e.g., >10), in which case the NBCS preferably also will block the flow. Preferably, all ACTS are also ALERTED and executed in a sequenced order, namely, ACT then ALERT. Preferably, conditions (i.e. triggers or violations) are either single or aggregate. SINGLE violations are an anomalous, single instance of a rule violation (e.g. a sudden change from encrypted connections to clear text), whereas AGGREGATE triggers are anomalous changes in thresholds over time (over 7 days there is a 40% increase in bandwidth utilization compared to the previous 4 weeks). Of course, these are just representative examples (as well as example numeric values), as more complex function(s) may be configured and enforced as desired.

Thus, according to the technique of this disclosure, network characteristics of an IoT device are adapted to be monitored and analyzed, preferably in real-time upon activation of the device, to derive the IoT's devices flow attributes that are then interpreted by a network control device into flow controls for the device. The approach herein is not limited for use upon IoT device activation; it may be implemented at any time with respect to the device's lifecycle. Irrespective of when the process is implemented, preferably the operation as described in utilized. Thus, when the IoT device initially begins to communicate, its communication flow is fingerprinted and this fingerprint is transformed into flow control rules, which are then placed into or otherwise associated a network boundary control system (NBCS), thus allowing for dynamic and automated threat detection and prevention based on anomalous and/or known-bad behavior.

Typically, and as described, the traffic flows in question are analyzed at OSI Layer 7 (the application layer) to determine the communication parameters and if they have changed (for example, presence/absence of TLS, different TLS parameters, presence of particular types of data such as SSNs in the data flow). In particular, the techniques of this disclosure take advantage of the fact that, while these types of data may change regularly for a non-IOT device, they should be relatively stable in the TOT case.

As described above, preferably IoT device manufacturers publish or otherwise provide the set of network characteristics associated with their devices. This information may be obtained from the manufacturers directly or indirectly, automatically or programmatically (e.g., via application programming interfaces). The set of network characteristics may be updated periodically or upon a given occurrence (e.g., the manufacturer's receipt of a support ticket for the device, a software upgrade, etc.). The information about the IoT device may be published at an Internet website associated with the manufacturer, at a site (e.g., an industry site) dedicated for this purpose, or at some other site or service. The information may be obtained by a given NBCS via any type of request-response protocol and preferably over a secure communication link. In one embodiment, the set of network characteristics is obtained programmatically or automatically on a periodic basis, on-demand, or otherwise.

The approach as described above provides significant advantages. It enables robust and fine-grained management and control over IoT devices based on their "normal" or expected (anticipated) behavior in the particular enterprise (or other) computing environment in which they are actually implemented. The learning approach described enables the implementing system (e.g., the NBCS) to monitor the network flow to and from the device(s) to generate unique device-specific fingerprints that can then be applied to monitor real-time use of the device. By fingerprinting the device in the manner (e.g., using manufacturer-supplied characteristics that are assigned "risk" weightings), the one or more network flow rules that are then derived from the learning process are more closely matched to how the device actually operates in the environment of interest. Thus, when the one or more network flow rules are thereafter triggered, appropriate response(s) can be carried out reliably and promptly, thereby further protecting the system(s) against anomalous behavior. Further, the network flow rules can be shared with other interested entities, thereby improving the security of other IoT-based systems and related security ecosystems.

Flow control rules generated by or otherwise associated with a NBCS (as well as responses that are carried out once those rules are triggered by potential anomalies) may be published to suppliers of services (typically managed services) such as, without limitation, an Internet Service Provider (ISP), a managed network services supplier, a managed firewall service supplier, a DLP or IPS service provider, a cloud service provider, and the like. Thus, in a typical use case as envisioned with respect to this disclosure, an enterprise may determine its flow control rules but then provide those rules to its service provider, which then applies or enforces the rules (e.g., on behalf of the enterprise, the service provider's customer) based on the particular implementation and the services being provided.

Figure 6:
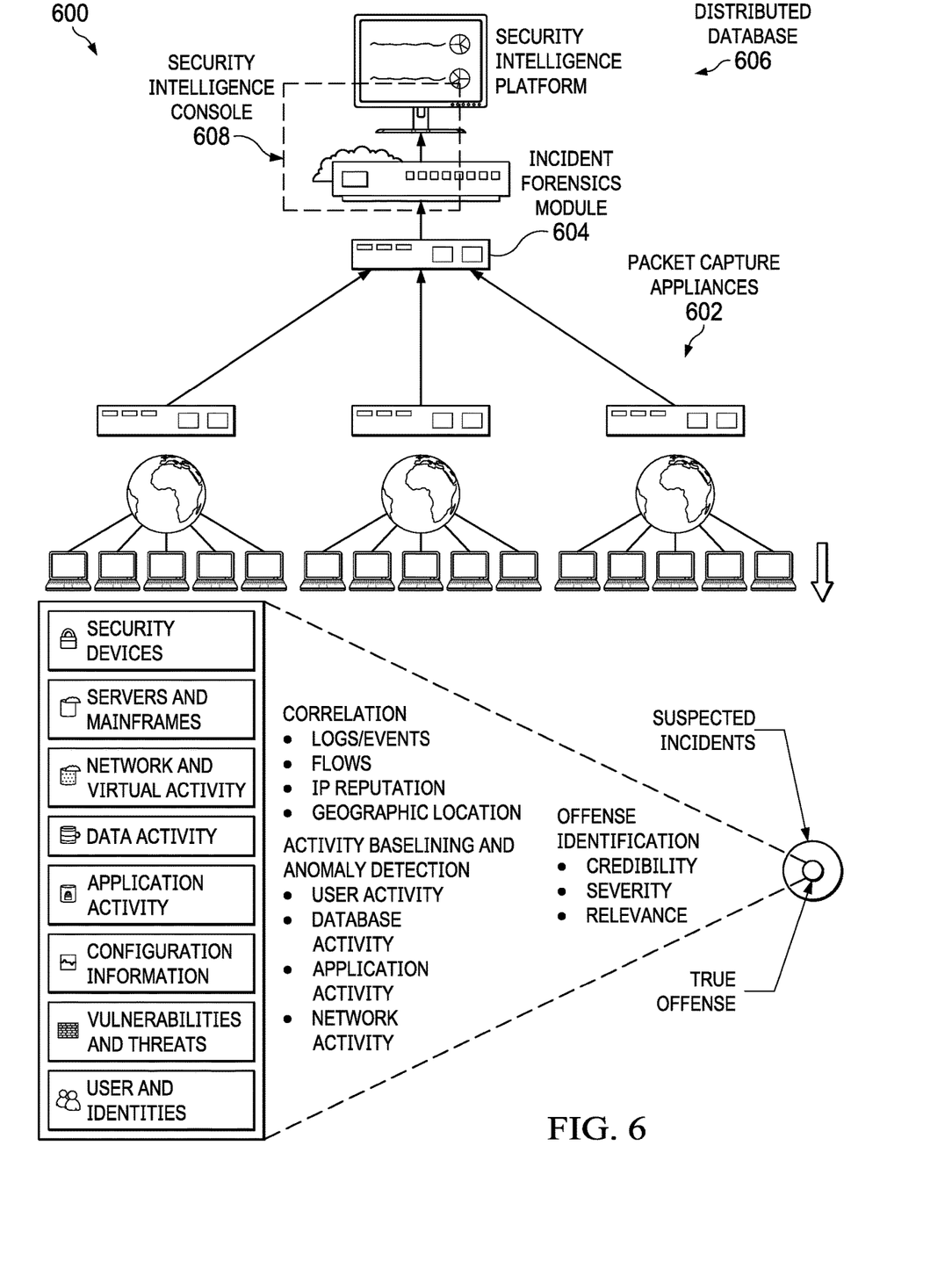
FIG. 6 depicts a security platform that may be used in association with the described technique.

In an alternative embodiment, the flow control rules generated by or otherwise associated with the NBCS (and the responses carried out once the rules are triggered) may be published back to other automation, devices and systems, such as a security intelligence platform. Known platforms of this type provide for search-driven data exploration, session reconstruction, and forensics intelligence to assist security incident investigations. A representative platform of this type is depicted in FIG. 6 and comprises a set of packet capture appliances 602, an incident forensics module appliance 604, a distributed database 606, and a security intelligence console 608. The packet capture and module appliances are configured as network appliances, or they may be configured as virtual appliances. The packet capture appliances 602 are operative to capture packets off the network (using known packet capture (pcap) application programming interfaces (APIs) or other known techniques), and to provide such data (e.g., real-time log event and network flow) to the distributed database 606, where the data is stored and available for analysis by the forensics module 604 and the security intelligence console 608. A packet capture appliance operates in a session-oriented manner, capturing all packets in a flow, and indexing metadata and payloads to enable fast search-driven data exploration. The database 606 provides a forensics repository, which distributed and heterogeneous data sets comprising the information collected by the packet capture appliances. The console 608 provides a web- or cloud-accessible user interface (UI) that exposes a "Forensics" dashboard tab to facilitate an incident investigation workflow by an investigator. Using the dashboard, an investigator selects a security incident. The incident forensics module 604 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher).

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Variants

Machine learning techniques may be used to enhance the behavior analysis. Machine learning (ML) algorithms iteratively learn from data, thus allowing computers to find hidden insights without being explicitly programmed where to look. Machine Learning is essentially teaching the computer to solve problems by creating algorithms that learn by looking at hundreds or thousands of examples, and then using that experience to solve the same problem in new situations. Machine Learning tasks are typically classified into the following three broad categories, depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, Linear Regression, Logistic Regression, Naive Bayes, and Neural Networks.

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

In this variant, information collected in the ALERT or ACT/ALERT database is provided to a machine learning/training sub-system, which uses the information about alerts and prior alert handling to build a prediction model that is then provided to other security systems or security analysts (e.g., via a threat monitoring console) to identify, categorize, prioritize and investigate events for the IoT devices or client(s).

It is not required that the technique be implemented in any type of network boundary control system, or that it be implemented in association with a particular NBCS such as an enterprise router. Alternatively, the technique described herein (e.g., creating network flow rules based on fingerprinting the IoT device network flow) may be implemented in whole or in part as-a-service. Further, the subject matter may be implemented within or in association with a data center that provides cloud-based computing, data storage or related services. The learning (including machine learning (ML)) functionality may be provided as a standalone function, or it may leverage functionality from other heuristic- or ML-based products and services including, without limitation, a Question-Answer based Natural Language Processing (NLP) system, products, device, program or process.

The learning processes described herein may utilize information in addition to the alert information drawn from the alert database. Thus, a machine learning algorithm may also take advantage of consolidated security and threat intelligence information from both structured and unstructured data sources.

As noted above, the approach herein is designed to be implemented in an automated manner within or in association with a network boundary control system, or any other type of security system, such as a SIEM.

A typical but non-limiting implementation of the technique herein is as a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

As noted above, a particular use case envisioned by this approach is one in which the flow control rules are generated by or on behalf of the enterprise, but then those rules are instantiated by a server provider, such as a cloud-based service provider. The following provides a brief summary of the characteristics of this type of services environment.

In particular, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cyber-security analytics.

The particular IoT devices that are monitored according to the techniques herein are not limited. Any IoT device as currently configured or that may be provided in the future may take advantage of the described techniques.

The particular set of network characteristics associated with an IoT device that are fingerprinted according to the technique herein may vary.

The one or more network flow rules or their syntax that are generated according to a device fingerprint for the IoT device may vary. Also, as used herein, a "network flow rate" may concern aspects of both network access and/or network flow.

The nomenclature of a device "fingerprint" should not be taken by way of limitation either. The "fingerprint" may be implemented as a model, a set of data, a data structure, a linked set of data points, or the like, with or without temporal association. For additional security, the fingerprint may be further processed (e.g., by hashing or the like) to protect the information details. There may be a single fingerprint, or one or more fingerprints, that define normal or abnormal behavior of the IoT device with respect to the given operating environment in question.

Having described the invention, what we claim is as follows:

1. A method of controlling network behavior of an Internet of Things (IoT) device, comprising:
   receiving a first data set defining a set of one or more network characteristics associated with the IoT device;
   associating to each of the one or more of the network characteristics a second data set, wherein the second data set is a set of one or more risk values specified for a particular network characteristic, wherein at least one risk value represents a degree to which a variation from the network characteristic is considered a deviation from an anticipated behavior of the IoT device;
   during a given time period, monitoring the IoT device based on the first and second data sets to learn a normal behavior of the IoT device with respect to a given operating environment;
   responsive to the monitoring, generating a fingerprint that defines the normal behavior of the IoT device with respect to the given operating environment, wherein the fingerprint is based at least in part on the set of network characteristics and their associated risk values;
   converting the fingerprint into a set of one or more network flow rules; and
   instantiating the one or more network flow rules in a network boundary control system (NBCS) to thereafter monitor for anomalous behavior associated with the IoT device.

2. The method as described in claim 1 wherein the fingerprint is generated by monitoring network flows associated with the IoT device against the set of network characteristics and their associated risk values.

3. The method as described in claim 1 further including:
   following instantiation in the NBCS system, monitoring network flows associated with the IoT device using the one or more network flow rules; and
   taking a given reporting or mitigation action upon triggering of a network flow rule.

4. The method as described in claim 1 wherein the given time period is a period of time starting from an initial connection of the IoT device.

5. The method as described in claim 1 wherein a given network characteristic is a communication pattern, and wherein the risk values for the communication pattern increase as a percentage deviation from a specified communication pattern increases.

6. The method as described in claim 1 wherein the first data set is received from a source associated with the IoT device, and wherein the risk values in the second data set are specified by an entity associated with a network.

7. The method as described in claim 1 further including publishing the one or more network flow rules.

8. An apparatus, comprising:
a processor;
computer memory holding computer program instructions executed by the processor to control network behavior of an Internet of Things (IoT) device, the computer program instructions operative to:
receive a first data set defining a set of one or more network characteristics associated with the IoT device;
associate to each of the one or more of the network characteristics a second data set, wherein the second data set is a set of one or more risk values specified for a particular network characteristic, wherein at least one risk value quantifies a degree to which a variation from the network characteristic deviates from an anticipated behavior of the IoT device;
during a given time period, monitor the IoT device based on the first and second data sets to learn a normal behavior of the IoT device with respect to a given operating environment;
responsive to the monitoring, generate a fingerprint that defines normal behavior of the IoT device with respect to the given operating environment, wherein the fingerprint is based at least in part on the set of network characteristics and their associated risk values;
convert the fingerprint into a set of one or more network flow rules; and
instantiate the one or more network flow rules in a network boundary control system (NBCS) to thereafter monitor for anomalous behavior associated with the IoT device.

9. The apparatus as described in claim 8 wherein the fingerprint is generated by computer program instructions that monitor network flows associated with the IoT device against the set of network characteristics and their associated risk values.

10. The apparatus as described in claim 8 wherein the computer program instructions are further operative:
following instantiation in the NBCS system, to monitor network flows associated with the IoT device using the one or more network flow rules; and
to take a given reporting or mitigation action upon triggering of a network flow rule.

11. The apparatus as described in claim 8 wherein the given time period is a period of time starting from an initial connection of the IoT device.

12. The apparatus as described in claim 8 wherein a given network characteristic is a communication pattern, and wherein the risk values for the communication pattern increase as a percentage deviation from a specified communication pattern increases.

13. The apparatus described in claim 8 wherein the first data set is received from a source associated with the IoT device, and wherein the risk values in the second data set are specified by an entity associated with a network.

14. The apparatus as described in claim 8 wherein the computer program instructions are further operative to deliver the one or more network flow rules for consumption by another entity.

15. A computer program product in a non-transitory computer readable medium for use in a data processing system to control network behavior of an Internet of Things (IoT) device, the computer program product holding computer program instructions that, when executed by the data processing system, are operative to:
receive a first data set defining a set of one or more network characteristics associated with the IoT device;
associate to each of the one or more of the network characteristics a second data set, wherein the second data set is a set of one or more risk values specified for a particular network characteristic, wherein at least one risk value represents a degree to which a variation from the network characteristic is considered a deviation from an anticipated behavior of the IoT device;
during a given time period, monitor the IoT device based on the first and second data sets to learn a normal behavior of the IoT device with respect to a given operating environment;
responsive to the monitoring, generate a fingerprint that defines the normal behavior of the IoT device with respect to the given operating environment, wherein the fingerprint is based at least in part on the set of network characteristics and their associated risk values;
convert the fingerprint into a set of one or more network flow rules; and
instantiate the one or more network flow rules in a network boundary control system (NBCS) to thereafter monitor for anomalous behavior associated with the IoT device.

16. The computer program product as described in claim 15 wherein the fingerprint is generated by computer program instructions that monitor network flows associated with the IoT device against the set of network characteristics and their associated risk values.

17. The computer program product as described in claim 15 wherein the computer program instructions are further operative:
following instantiation in the NBCS system, to monitor network flows associated with the IoT device using the one or more network flow rules; and
to take a given reporting or mitigation action upon triggering of a network flow rule.

18. The computer program product as described in claim 15 wherein the given time period is a period of time starting from an initial connection of the IoT device.

19. The computer program product as described in claim 15 wherein a given network characteristic is a communication pattern, and wherein the risk values for the communication pattern increase as a percentage deviation from a specified communication pattern increases.

20. The computer program product described in claim 15 wherein the first data set is received from a source associated with the IoT device, and wherein the risk values in the second data set are specified by an entity associated with a network.

* * * * *